(12) United States Patent
Kraemer et al.

(10) Patent No.: US 7,841,180 B2
(45) Date of Patent: Nov. 30, 2010

(54) METHOD AND APPARATUS FOR CONTROLLING COMBUSTOR OPERABILITY

(75) Inventors: Gilbert O. Kraemer, Greer, SC (US); John Joseph Lipinski, Simpsonville, SC (US); Jonathan Lloyd Male, Schoharie, NY (US)

(73) Assignee: General Electric Company, Schenectady, NY (US)

( * ) Notice: Subject to any disclaimer, the term of this patent is extended or adjusted under 35 U.S.C. 154(b) by 1015 days.

(21) Appl. No.: 11/613,049

(22) Filed: Dec. 19, 2006

(65) Prior Publication Data
US 2009/0223225 A1    Sep. 10, 2009

(51) Int. Cl.
*F02C 1/00* (2006.01)
*F02G 3/00* (2006.01)
(52) U.S. Cl. .................. 60/723; 60/777; 60/39.822
(58) Field of Classification Search ............. 60/777, 60/39.822, 723, 737, 804, 734, 740, 742, 60/746, 747, 748, 752–760
See application file for complete search history.

(56) References Cited

U.S. PATENT DOCUMENTS

| | | | |
|---|---|---|---|
| 5,320,089 A | 6/1994 | Schaefer et al. | |
| 5,394,862 A | 3/1995 | Firatli et al. | |
| 5,623,819 A * | 4/1997 | Bowker et al. | 60/776 |
| 5,946,917 A * | 9/1999 | Hums et al. | 60/723 |
| 6,272,863 B1 | 8/2001 | Pfefferle et al. | |
| 6,358,879 B1 | 3/2002 | Pfefferle et al. | |
| 6,805,552 B2 | 10/2004 | Janouch et al. | |
| 7,003,958 B2 * | 2/2006 | Dinu et al. | 60/737 |
| 7,017,329 B2 * | 3/2006 | Farhangi et al. | 60/39.11 |
| 7,047,746 B2 * | 5/2006 | Hellat | 60/723 |
| 7,086,235 B2 * | 8/2006 | Von Arx et al. | 60/777 |
| 7,093,438 B2 * | 8/2006 | Dinu et al. | 60/737 |
| 7,117,674 B2 * | 10/2006 | Sprouse et al. | 60/723 |
| 7,117,676 B2 * | 10/2006 | Farhangi et al. | 60/736 |
| 7,421,844 B2 * | 9/2008 | Griffin et al. | 60/777 |
| 7,444,820 B2 * | 11/2008 | Colket, III | 60/777 |
| 7,469,543 B2 * | 12/2008 | Veninger | 60/723 |
| 7,469,544 B2 * | 12/2008 | Farhangi | 60/740 |
| 2003/0205048 A1* | 11/2003 | Hellat | 60/723 |
| 2006/0080968 A1* | 4/2006 | Griffin et al. | 60/777 |
| 2006/0156729 A1* | 7/2006 | Sprouse et al. | 60/723 |
| 2008/0314045 A1* | 12/2008 | Carroni et al. | 60/772 |
| 2009/0139235 A1* | 6/2009 | Davis et al. | 60/723 |

FOREIGN PATENT DOCUMENTS

EP    1 519 116 A1    3/2005

OTHER PUBLICATIONS

Carroni, R., Griffin, T. and Kelsall, G., "Cathlean: catalytic, hybrid, lean-premixed burner for gas turbines," Applied Thermal Engineering 24 (2004), pp. 1665-1676.

* cited by examiner

*Primary Examiner*—William H Rodríguez
(74) *Attorney, Agent, or Firm*—Armstrong Teasdale LLP

(57) ABSTRACT

A method for assembling a gas turbine engine includes providing at least one combustor assembly defining a combustion chamber. At least one fuel nozzle is positioned at a forward end of the combustion chamber. The at least one fuel nozzle is configured to inject a premixed fuel/air mixture into the combustion chamber. A catalytic material is applied to at least a portion of the at least one fuel nozzle.

18 Claims, 6 Drawing Sheets

METHOD AND APPARATUS FOR CONTROLLING COMBUSTOR OPERABILITY

BACKGROUND OF THE INVENTION

This invention relates generally to gas turbine engines and, more particularly, to methods and apparatus for controlling combustor operability.

Gas turbine engines operate in many different operating conditions, and combustor performance facilitates engine operation over a wide range of engine operating conditions. More specifically, stable combustion facilitates preventing engine blowout and enables the engine to operate at engine rated thrust and/or power levels. Further, for gas turbine engines operated with dry low oxides of nitrogen (DLN) techniques, combustion stability also facilitates controlling oxides of nitrogen ($NO_x$) and carbon monoxide (CO) emissions.

At least some known DLN combustion systems utilize premixed fuel and air, and operate with lean fuel/air (F/A) ratios to facilitate reducing $NO_x$ emissions. Lean fuel/air ratios are defined as operations wherein the ratio of fuel to air supplied to the combustion chamber is below a stoichiometric ratio of fuel to air required for the fuel under consideration. However, one possible consequence of the lean, premixed operation is that the combustion system may operate near a lean blow out (LBO) boundary. Lean blow out, or weak extinction, is the operating point at which the mixture of fuel and air is no longer flammable. For premixed multi-nozzle systems, weak extinction can be defined as the operating point at which there is a significant drop in the combustion efficiency and/or complete extinction of the flame. The LBO boundary or constraint, if violated, may result in partial or complete blowout (i.e., loss of the combustion flame).

In some conventional DLN fuel nozzles, a mixing potential is reduced to produce locally richer regions with improved flammability for acceptable combustion dynamics and lean blow out (LBO) limits. However, the higher adiabatic flame temperatures of these locally richer regions produce a significant or the majority of the combustor's $NO_x$. The rate of $NO_x$ formation increases exponentially with temperature, so even a small region of higher temperature can produce a large percentage of the total $NO_x$ emissions.

BRIEF DESCRIPTION OF THE INVENTION

In one aspect, a method for assembling a gas turbine engine is provided. The method includes providing at least one combustor assembly defining a combustion chamber. At least one fuel nozzle is positioned at a forward end of the combustion chamber. The at least one fuel nozzle is configured to inject a premixed fuel/air mixture into the combustion chamber. A catalytic material is applied to at least a portion of the at least one fuel nozzle.

In another aspect, a gas turbine engine is provided. The gas turbine engine includes a combustor defining a combustion chamber. A plurality of fuel nozzles are positioned at a forward end of the combustion chamber such that each of the plurality of fuel nozzles is positioned to inject a premixed fuel/air mixture into the combustion chamber. At least a portion of at least one of the plurality of fuel nozzles is coated with a catalytic material.

In yet another aspect, a nozzle assembly for a gas turbine engine is provided. The nozzle assembly includes a fuel nozzle including a substrate surface region. The substrate surface region defines a concave interior surface region of the fuel nozzle. A catalytic material is applied to the concave interior surface region.

DETAILED DESCRIPTION OF THE INVENTION

Figure 1:
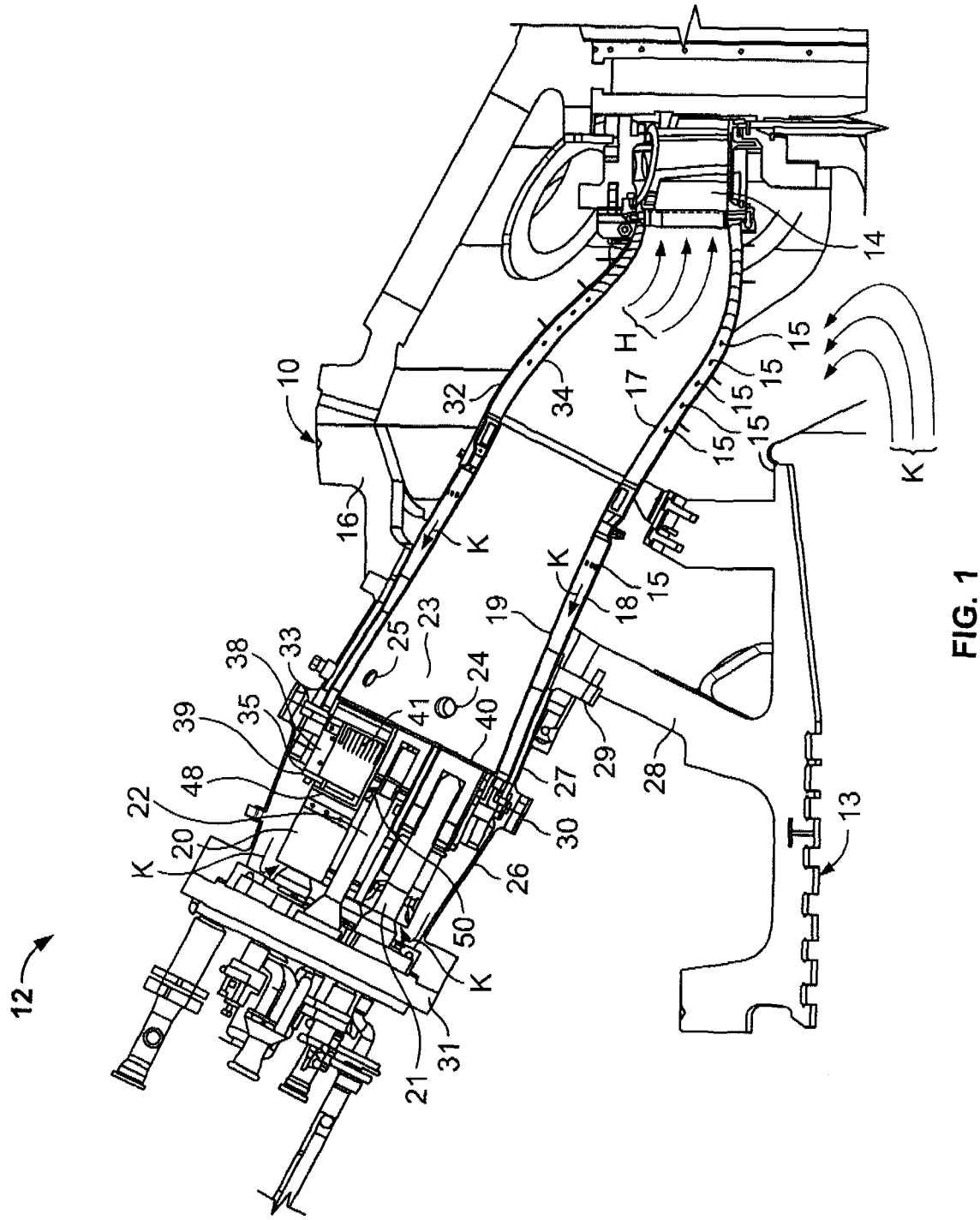
FIG. 1 is a partial sectional view of a gas turbine combustion system.

The present invention provides a method and apparatus for enhancing combustor stability and lean limit for facilitating increasing fuel premixedness and lowering $NO_x$ emissions. The present invention is described below in reference to its application in connection with a gas turbine engine used in an industrial environment. However, it will be apparent to those skilled in the art and guided by the teachings herein provided that the invention is likewise applicable to any suitable combustion turbine system application. In addition, the principles and teachings set forth herein are applicable to gas turbine engines using a variety of combustible fuels such as, without limitation, natural gas, gasoline, kerosene, diesel fuel and jet fuel. The description is therefore set forth only by way of illustration, rather than limitation.

In one embodiment, a gas turbine combustion system is provided for use with a heavy duty industrial gas turbine. Specifically, the combustion system facilitates several operating advantages, including, but not limited to, (a) low $NO_x$ and CO emissions as measured at an exhaust plane of the gas turbine; (b) acceptable flame stability in a low emissions operating mode; (c) adequate flame stability at low fuel/air ratios and lean-blow-out margin to achieve low emissions over a broad range of gas turbine load settings (for example, between approximately 35% to 100% of full rated load); and/or (d) low combustion acoustic noise (dynamic pressure fluctuations).

Various configurations of the present invention also provide an efficient, fuel-lean, premixed combustion system with respect to bluff-body flame stabilization. Efficient bluff body flame stabilization is facilitated utilizing a multiple fuel nozzle and flame holding mechanism arrangement in a gas turbine combustor. In one embodiment, the multiple fuel nozzle and flame holding mechanism arrangement is duplicated in a plurality of combustion chambers as required in specific applications. This duplication facilitates the gas turbine operating with low $NO_x$ and CO emission levels while maintaining acceptable flame stability. In addition, dynamic pressures are kept low, so that the combustion components are not adversely affected.

The relative physical size of fuel nozzle components, the dimensions of the end cap of the round combustion chamber, and the relative size of premixing tubes leading up to and through the end cap of the chamber, in which fuel and air are premixed are selected to achieve a desired combination of emissions capability, sufficient flame stability, and reduced or minimal dynamic pressure fluctuations.

In one embodiment, a combustor defines at least one circular combustion chamber. A multiple fuel nozzle arrangement is coupled at least partially within the circular combustion chamber. For example, in one embodiment, five, equally-sized fuel nozzles are spaced circumferentially in the combustor at approximately the same distance from a center of the circular combustion chamber. The fuel nozzles surround a sixth fuel nozzle positioned at the center of the combustion chamber. In the exemplary embodiment, the center fuel nozzle is smaller than the surrounding outer fuel nozzles and may be configured differently. A control volume of the combustion chamber is bounded by a tubular combustion liner and by a round end cap. Premixed fuel and air are introduced to the tubular combustion chamber at an injection plane that coincides with the physical plane of the end cap. In one embodiment, the center fuel nozzle is configured to receive a richer fuel/air mixture than the surrounding fuel nozzles. Some configurations of the present invention control fuel flow through the center fuel nozzle to simultaneously increase combustion stability and reduce emissions. More particularly, use of the center fuel nozzle in combination with the surrounding nozzles facilitates achieving an advantageous concentration distribution of fuel/air ratio within the entire combustion chamber. Further, in certain embodiments the center fuel nozzle is configured to produce its own locally advantageous concentration distribution of fuel/air ratio (as measured radially outward from the center hub to the outer shroud of the premixing tube).

In the exemplary embodiment, a gas turbine 10 includes a combustor 12 as shown in FIG. 1 and a compressor 13. Gas turbine 10 is represented in FIG. 1 by a single turbine nozzle 14. Turbine and compressor rotors are connected by a single common shaft (not shown in the Figures). In operation, a portion of the total compressor air flows from the exit of the compressor diffuser (i.e., inlet holes 15) to combustor 12 in a reverse direction relative to the direction of air flow through the compressor and turbine sections, where it is used to cool combustor 12 and to supply air to the combustion process.

Combustor 12 is arranged in an annular array about the periphery of a gas turbine casing 16. High pressure air H from compressor 13 flows into combustor 12 through an array of air inlet holes 15 distributed across a transition piece 17 and a flow sleeve 18 near an outlet end of a combustor liner 19. Compressed air delivered to combustor 12 flows through an annular passage bounded by combustor flow sleeve 18 and combustor liner 19 to a combustor inlet end or head end 20 wherein a plurality of fuel nozzles 21 and 22 are positioned, also referred to as "air-fuel injectors," "fuel injection nozzles," "fuel injectors," or "fuel nozzle assemblies." In one embodiment, an array of five outer fuel nozzles 21 are positioned about at least one center fuel nozzle 22. In alternative embodiments, the number of outer fuel nozzles 21 and/or the number of center fuel nozzles 22 may vary. By way of example only, some configurations include more than one center fuel nozzle 22 surrounded by a different number of outer fuel nozzles 21 than that described herein.

At an inlet end of each combustor 12, compressed air and fuel are mixed and are channeled into a combustion burning zone 23. Ignition is initially achieved when the starting sequence of gas turbine 10 is executed in combustor 12 by one or more spark plugs (not shown) in conjunction with cross fire tubes 24 (one shown). The spark plugs extend through an equivalent number of ports 25 defined in combustor liner 19. The spark plugs are subsequently retracted from combustion burning zone 23 once a flame has been continuously established. At the opposite end of combustion burning zone 23, hot combustion gases K flow into a double-walled transition piece 17 that couples an outlet end of each combustor liner 19 with an inlet end of turbine nozzle 14 to channel hot combustion gas flow K to turbine 10, wherein the enthalpy of the hot gas flow is converted to shaft work in the turbine rotor via the expansion of gas flowing through stationary and rotating turbine airfoils (not shown in the Figures).

Figure 2:
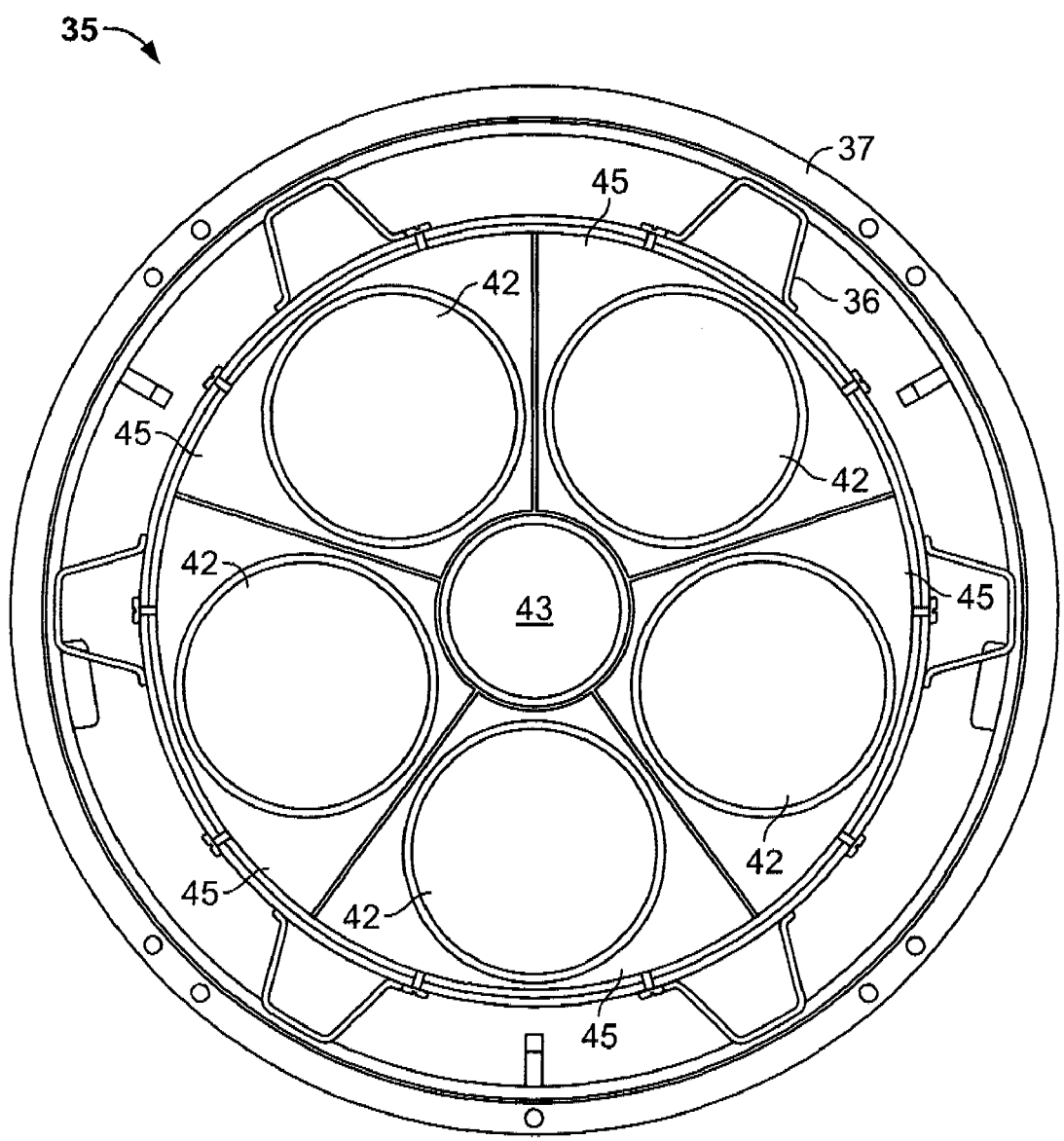
FIG. 2 is a forward end view of a combustion liner cap assembly.

Combustor 12 includes a substantially cylindrical combustion casing assembly that includes two sections, namely, a forward combustion casing 26 and an aft combustion casing 27. Combustion casings 26 and 27 are coupled to compressor discharge casing 28 by a bolted joint 29 and forward combustion casing 26 is connected to aft combustion casing 27 by bolted joint 30. Casing head end 20 is closed by an end cover assembly 31 that may also include fuel and air supply tubes, manifolds and associated valves for feeding gas, liquid fuel, air, and water (if desired) to combustor 12, as described in greater detail below. In one embodiment, end cover assembly 31 is configured as a mounting base to receive a plurality, such as five, outer fuel nozzles 21. More specifically, as shown in FIG. 2, the array of outer fuel nozzles 21 are arranged around a center fuel nozzle 22 that is smaller (in terms of size, air and/or fuel flow capacity) than outer fuel nozzles 21.

As shown in FIG. 1, a substantially cylindrical flow sleeve 18 is concentrically mounted within combustion casings 26 and 27. Flow sleeve 18 is coupled at its aft end to an outer wall 32 of a double walled transition piece 17. Compressor air flows through an outer passage of the double walled transition piece 17, over and through flow sleeve 18 and towards combustor head end 20. Flow sleeve 18 is connected at its forward end, by means of a radial flange, to aft combustor casing 27 at the bolted joint 30 where forward combustion casing 26 and aft combustion casing 27 are joined.

In one embodiment, flow sleeve 18 is concentrically arranged with a combustor liner 19 which is connected at one end with an inner wall 34 of transition piece 17. As shown in FIG. 2, the opposite (forward or head) end of combustor liner 19 is supported by a combustion liner cap assembly 35 which is, in turn, supported within the combustor casing by a plurality of struts 36 and an associated mounting flange assembly 37. An outer wall 32 of transition piece 17, as well as a portion of flow sleeve 18 that extends aft of the location at which aft combustion casing 27 is bolted to compressor discharge casing 28, are formed with an array of apertures or inlet holes 24 that extend over their respective peripheral surfaces to permit air to flow in reverse from the compressor 13 through apertures 15 into the annular space defined between flow sleeve 18 and combustor liner 19 and towards the upstream or head end 20 of combustor 12 (as indicated by flow arrows K shown in FIG. 1).

As shown in FIG. 1, combustion liner cap assembly 35 supports a plurality of pre-mix tube assemblies 38, such that each is mounted substantially concentrically about each fuel nozzle 21 and 22. Each pre-mix tube assembly 38 is supported within combustion liner cap assembly 35 at its forward and aft ends by forward plate 39 and aft plate 40, respectively. Plates 30 and 40 each include openings that are substantially aligned with the open-ended pre-mix tube assemblies 38. Each pre-mix tube assembly 38 includes an assembly of two tubes separated by a pre-mix tube hula seal 41, which permits the dual-tube assembly to thermally expand and contract as combustion liner cap assembly 35 expands thermally from cold non-operating conditions to hot operating conditions. Thus, as the distance between forward support plate 39 and aft support plate 40 changes due to thermal expansion of the overall assembly, the pre-mix tube assemblies 38 are free to expand accordingly along an axis of symmetry.

Figure 3:
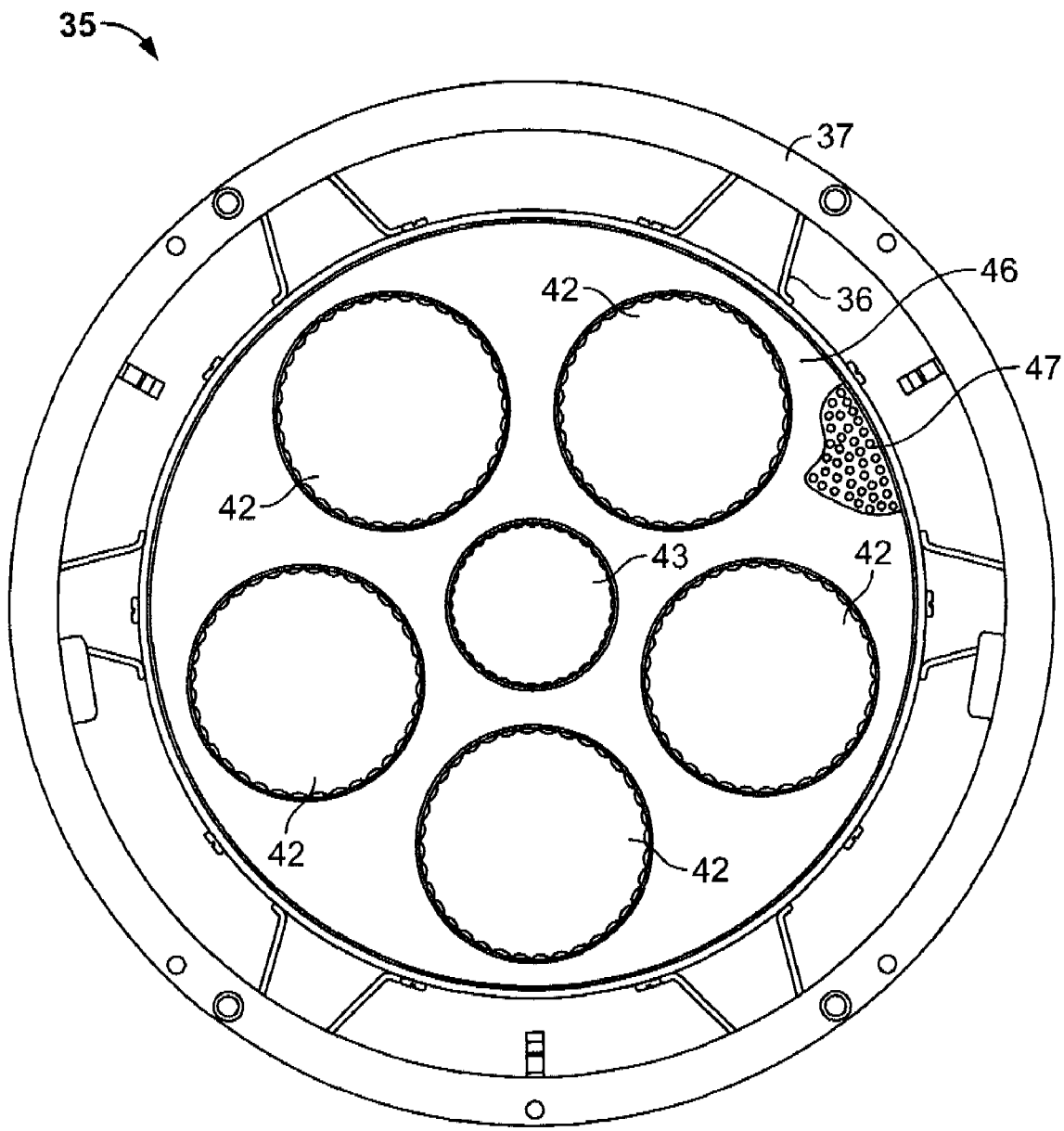
FIG. 3 is an aft end view of a combustion liner cap assembly.

In the exemplary embodiment, combustion liner cap assembly 35 includes openings 42, for outer fuel nozzles 21 and their premix tubes, and openings 43, for center fuel nozzle 22 and its premix tube, in forward support plate 39. Moreover, in the exemplary embodiment, forward support covers 45 are included and are each mounted to forward support plate 39. Forward support covers 45 facilitate securing the forward end of each of the outer premix tubes. Referring to the aft end view of combustion liner cap 35 shown in FIG. 3, a similar structure supports premix tubes for center fuel nozzle 22 and outer fuel nozzles 21. In the exemplary embodiment, additional features may include an impingement plate 46 including an array of effusion cooling apertures 47. Cooled impingement plate 46 functions as a radiation shield for cap assembly 35 to shield it from radiation heat release resulting from combustion during operation in adjacent combustion burning zone 23.

Aft plate 40 of combustion liner cap assembly 35 mounts to a plurality of forwardly-extending floating collars 48. In the exemplary embodiment, collars 48 include one for each premix tube assembly 38, arranged in substantial alignment with the openings in aft plate 40. Each collar 48 supports an air swirler 50, also referred to herein as a "swirling vane", which is, for example, integrally formed in fuel nozzles 21 and 22. The arrangement is such that air flowing in the annular space between combustor liner 19 and flow sleeve 18 is forced to reverse direction at combustor inlet end 20 of combustor 12 (between end cover assembly 31 and combustion liner cap assembly 35) and to flow through air swirlers 50 and pre-mix tube assemblies 38. Fuel passages integrally manufactured into each of air swirlers 50 deliver fuel through an arrangement of apertures that continuously introduce gaseous fuel, depending upon the operational mode of gas turbine 10 into the passing air, thereby creating a fuel and air mixture that is subsequently and continuously ignited in combustion burning zone 13.

Figure 4:
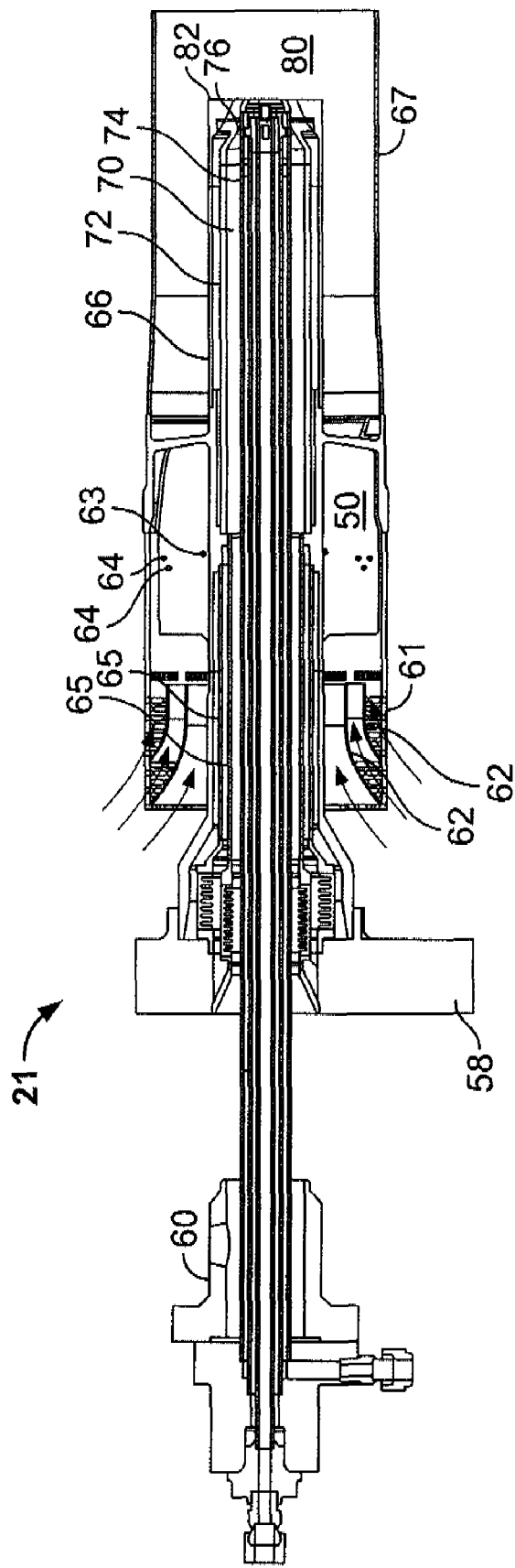
FIG. 4 is a sectional view of an outer fuel injection nozzle that may be useful in the combustion system shown in FIG. 1.
Figure 5:
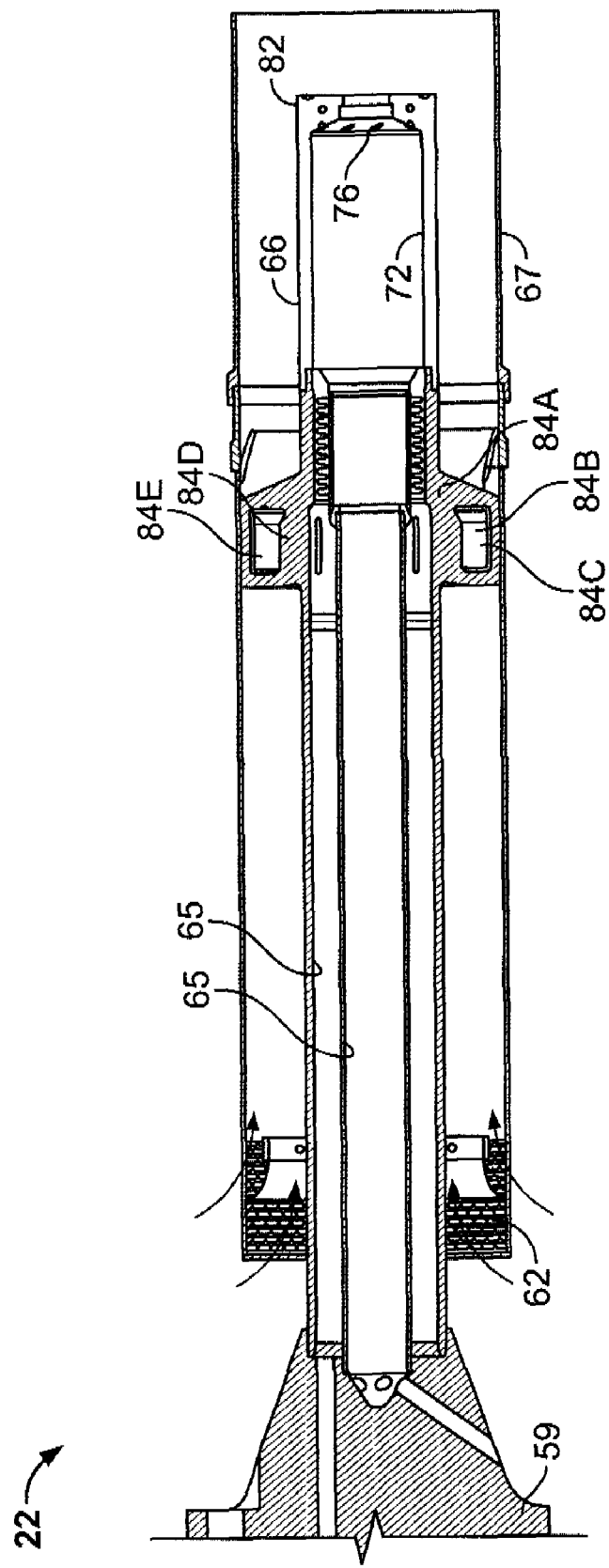
FIG. 5 is a sectional view of a center fuel nozzle that may be useful in the combustion system shown in FIG. 1.

FIG. 4 is a sectional view of an outer fuel nozzle 21. FIG. 5 is a sectional view of center fuel nozzle 22. Each fuel nozzle 21 and 22 includes a flange assembly 58 and 59, respectively, which couples via a sealed and bolted joint assembly to the inside of end cover assembly 31 (shown in FIG. 1). Fluids including, but not limited to, gas fuel and purge air, are supplied to passages of fuel nozzles 21 and 22. Specifically, such fluids are supplied through flange assembly 58 and flange assembly 59 after having passed through piping manifold assemblies (not shown). End cover assembly 31 is thus supplied with fuels and other working fluids that are delivered via fuel nozzles 21 and 22. A liquid fuel and water injection cartridge 60 is coupled to the outside of end cover assembly 31. More specifically, cartridge 60 is installed within each outer fuel nozzle 21.

In one embodiment in which liquid fuel is burned as an alternative to gaseous fuel, a liquid fuel mode of operation is provided. During the liquid fuel mode, liquid fuel and water are sprayed into combustion burning zone 13 via liquid fuel and water injection cartridge 60. In an alternative embodiment in which a liquid fuel mode of operation is not required, a different configuration (not shown) of liquid fuel and water injection cartridge 60 is provided that is not configured to pass liquid fuel or water, but, rather, occupies an equivalent space within gas outer fuel nozzle 21.

Referring further to FIG. 4, outer fuel nozzle 21 includes a screen or inlet flow conditioner 61 that includes an array of openings and guide vanes 62 that create a drop in pressure and provides directional guidance for incoming air supplied to combustor chamber inlet or head end 20. Air channeled through inlet flow conditioner 61 is subsequently mixed with gaseous fuel through a plurality of swirling vanes 50, each of which includes integral passages that lead to inner premix gas injection holes 63 (inner premixing holes) and outer premix gas injection holes 64 (outer premixing holes). Concentric tube assemblies 65, arranged in outer fuel nozzles 21, form independent fuel passages that facilitate control of fuel flow between inner premix gas injection holes 63 and outer premix gas injection holes 64. This inner and outer flow division of gas fuel in the outer fuel nozzles 21 facilitates control of the concentration distribution of premixed fuel and air as measured radially from a hub 66 of each fuel nozzle 21 or 22 to a shroud 67 of each fuel nozzle 21 or 22. Methods used to actively or passively deliver a gas fuel supply that divides the fuel flow, prior to entering fuel nozzle flange assembly 58, between inner and outer premix passages, can be selected as a design choice depending on design requirements of a specific gas turbine application. Methods that enable the concentration distribution of premixed air and fuel to be adjusted to a predetermined value, within one or more fuel nozzles and as a function of the gas turbine 10 operating conditions (such as the methods described herein), can be used to produce minimal $NO_x$ emissions along with minimal combustion dynamic pressures.

In the exemplary embodiment, an additional annular passage 70 is defined between an inner diameter of wall 72 and an outer diameter 74 of liquid fuel and water injection cartridge 60 (or a blank counterpart, not shown, that does not channel fluid, but occupies the same or an equivalent space). Annular passage 70 leads to an array of diffusion fuel metering holes 76. Diffusion fuel metering holes 76 and annular passage 70 are supplied with fuel and enable the direct injection of fuel into combustion burning zone 13 and the production of a diffusion-type combustion flame that is stabilized in a recirculation zone 80 immediately downstream of fuel nozzle aft tip 82. As a result, diffusion combustion can be used as a stabilization feature of the combustion system at ignition and low load conditions. Diffusion combustion as a stable pilot flame can be used with, or without, simultaneous premixed combustion in various desired combinations, all of which occurs in combustion burning zone 13.

Referring to FIG. 5, in the exemplary embodiment, center fuel nozzle 22 is similar in design features to outer fuel nozzles 21, except that center fuel nozzle 22 does not include separate passages for inner and outer premix gas fuel, and does not contain a liquid fuel and water injection cartridge or a blank counterpart. Among other functions, center fuel nozzle 22 can provide and maintain stability of the overall combustion flame structure in combustion burning zone 23. An overall flame structure in some configurations may include combusting fuel and air introduced by all of the fuel nozzles 21 and 22, depending upon the operating mode and the load requirements of the gas turbine. By maintaining a slightly higher average fuel-to-air ratio from center fuel nozzle 22 to outer fuel nozzles 21, outer fuel nozzles 21 are provided with a more stable ignition source as the premixed fuel and air mixture from outer fuel nozzles 21 interact with the center fuel and air combusting mixture produced by center fuel nozzle 22 in combustion burning zone 13. Center fuel nozzle 22 can be used as a combustion stability anchor. Thus, although center fuel nozzle 22 may produce relatively more $NO_x$ emissions than outer fuel nozzles 21, the stabilizing effect of center fuel nozzle 22 enables the majority of the fuel/air ratio for the entire combustor to be relatively low such that overall $NO_x$ emissions can be controlled at minimal levels. Thus, some configurations of the present invention realize an advantageous trade-off between $NO_x$ emissions and stability.

In the exemplary embodiment, an optimum placement and/or size of premix gas metering holes for center fuel nozzle 22 is facilitated using computational methods to determine optimum fuel/air concentration profile as measured from hub 66 to shroud 67. Computational methods can be used to establish a target fuel/air, or equivalence ratio profile as measured radially from hub 66 to shroud 67. For example, in one embodiment an absolute radial position, mechanical area, gas fuel flows per hole and/or effective flow areas for holes A, B, C, D, and E (denoted collectively as holes 84) can be determined.

Figure 6:
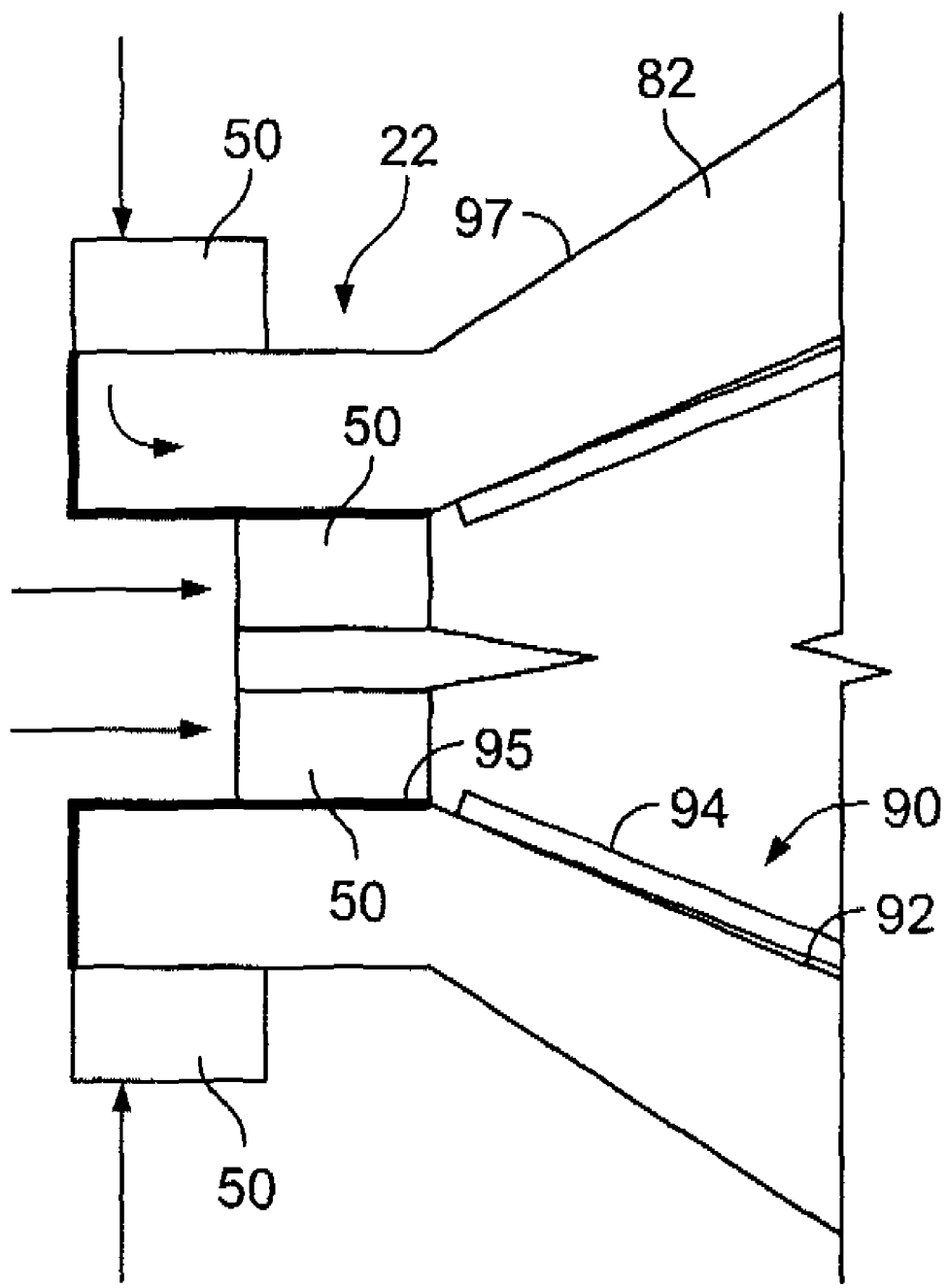
FIG. 6 is a sectional view of a center fuel nozzle including a concave interior surface region.

In the exemplary embodiment, a small flame zone is defined within recirculation zone 80 immediately downstream of center fuel nozzle aft tip 82 to facilitate anchoring and/or stabilizing the main combustion flow field. A lean catalyst, such as a catalytic material, is applied to and/or bonded to one or more components at least partially defining the recirculation zone to facilitate limiting the heat released on a surface of the components to aid in combustion. In contrast, such components in conventional turbine engines which include a surface not coated with a catalytic material, e.g., a non-catalytic surface, may produce an undesirable thermal quenching affect that may result in flame extinction. In a particular embodiment, the catalytic surface is oriented to inhibit flame holding in regions not sufficiently cooled. In this particular embodiment, the catalyst is located in a region of desired flame holding at tip 82 such that an outer surface of center fuel nozzle 22, including an outer surface of tip 82, can be for example backside impingement cooled. More specifically, in the exemplary embodiment, center fuel nozzle 22 is impingement cooled by air swirlers 50 of surrounding outer fuel nozzles 21. As shown in FIG. 6, air swirlers 50 direct air flow radially inwardly toward center fuel nozzle 22 and along the outer surface of center fuel nozzle 22 for facilitating cooling center fuel nozzle 22 during operation.

In one embodiment, flame stabilization, particularly for fuels with low catalytic activity, such as methane, is aerodynamically enhanced. In this embodiment, the catalyst is integrated into the aerodynamic design of the components defining the recirculation zone for facilitating enhancing lean blow out. The catalyst stimulates fuel oxidation in the boundary layer which increases the net heat release, thereby enhancing local flame stability. For example, applying a catalytic material to at least a portion of center fuel nozzle 22 facilitates stabilizing a flame nursery zone downstream of center fuel nozzle 22.

FIG. 6 is a sectional view of an exemplary center fuel nozzle 22 including aft tip 82. In the exemplary embodiment, center fuel nozzle 22 includes a substrate surface region 90. Substrate surface region 90 may be shaped with predetermined dimensions having predetermined contours and thicknesses that are substantially similar to the dimensions of center fuel nozzle 22. In one embodiment, the substrate is a metallic material. In an alternative embodiment, the substrate is a ceramic material.

Substrate surface region 90 defines a concave interior surface region 92 of center fuel nozzle 22 that facilitates enhancing a bluff body recirculation zone size and/or stability. A catalytic material 94 is applied to, and/or bonded to, at least a portion of substrate surface region 90 that at least partially defines a recirculation zone. Catalytic material 94 facilitates heat release on a surface of center fuel nozzle 22 to aid in combustion. Catalyst material 94 is applied to, and/or bonded to, a region of desired flame holding at tip 82 to facilitate backside impingement cooling of center fuel nozzle 22. Catalyst material 94 extends along substrate surface region 90 to coat at least a portion of an inner surface 95 of center fuel nozzle 22 and/or at least a portion of an outer surface 97 of center fuel nozzle 22 including aft tip 82. Unlike in the present invention wherein catalytic material 94 facilitates heat release at center fuel nozzle 22, in conventional gas turbine engines, components not coated with, or including, a catalytic material layer or surface may experience an undesirable thermal quenching affect, as described above. Further, in a particular embodiment, the catalytic material surface or layer facilitates inhibiting flame holding in regions not sufficiently cooled to prolong component life.

In the exemplary embodiment, at least a portion of center fuel nozzle 22, such as aft tip 82, is fabricated from a metal or ceramic material. Catalytic material 94 is applied or bonded directly to or incorporated into (or any combination thereof) the metal or ceramic surface of substrate surface region 90, such as concave interior surface region 92. Alternatively, at least one thermal insulating coating, such as a thermal barrier coating (TBC) layer, is applied and/or bonded to substrate surface region 90. In one embodiment, the TBC includes at least one thermal barrier coating layer bonded to concave interior surface region 92. The TBC layers may include a metal oxide material, such as yttria-stabilized zirconia having a chemical composition of 2-8 weight percent yttria oxide with a balance of zirconia. Alternately, the TBC layers may include other ceramic materials and the associated number of layers and the thicknesses of these layers may be varied according to appropriate standards and tolerances.

In further exemplary embodiments, at least a portion of any outer fuel nozzle(s) 21 and/or center fuel nozzle(s) 22 is fabricated from a metal or ceramic material and produced as described in greater detail herein. Thus, although an exemplary center fuel nozzle 22 is described, it should be apparent to those skilled in the art and guided by the teachings herein provided that the processes as described herein are suitable for producing outer fuel nozzle(s) 21 and/or center fuel nozzle(s) 22, as desired.

As used herein, the term layer refers to, without limitation, a sheet-like expanse or region of a material or materials covering a surface, or forming an overlying or underlying part or segment of an article such as a turbine component. A layer has a thickness dimension. The term layer does not refer to any particular process by which the layer is formed. For example, a layer can be formed by a spraying, coating or laminating process.

Catalytic material 94 is then applied or bonded to or a constituent of (or any combination thereof) the thermal insulating coating. In one embodiment, catalytic material 94 is applied to the outermost thermal barrier coating layer. Catalytic material 94 includes any suitable catalytic material including, without limitation, a catalytic coating or layer made of a suitable metal alloy heat treated onto the metal surface or the outermost thermal barrier coating layer, a vapor deposited metal material, a coated catalytic material, a wash coat including a catalytic material or a thermal barrier coating including a catalyst, such as a metal or metal oxide coating to facilitate reducing a heat flux and/or an underlying metal surface temperature. Further, catalytic wash coats and thermal barrier coatings facilitate increasing a total catalyst surface area, catalyst storage and/or catalyst activity.

In an alternative embodiment, the thermal insulating coating includes a wash coat within which catalytic material 94 is dispersed. Any suitable wash coat known in the art and guided by the teachings herein provided may be used in cooperation with catalytic material 94. In one embodiment, the wash coat is fabricated of a suitable ceramic material having suitably sized particles that are bonded together to form a porous layer defining a plurality of pores. The increased surface area of the wash coat due to the relatively large porosity and defined pores facilitates dispersing catalytic material 94 within the pores. In each of these embodiments, the catalytic material stimulates fuel oxidation in the boundary layer thereby increasing the net heat release for greater local flame stability. In one embodiment, catalytically coating concave interior surface region 92 facilitates developing a more reactive fuel/air mixture to enhance flame stabilization downstream of center fuel nozzle 22.

It should be apparent to those skilled in the art and guided by the teachings herein provided that any portion of center fuel nozzle 22 may include a catalyst, such as a catalytic material surface or layer applied to and/or bonded to, directly or indirectly through intermediate thermal insulating layers, to substrate surface region 90. Further, it should be apparent to those skilled in the art and guided by the teachings herein provided that any portion of surrounding outer fuel nozzles 21 and/or other components at least partially defining combustion zone 23 within combustion chamber 12 may include a catalyst, such as a catalytic material surface or layer applied to and/or bonded to, directly or indirectly through intermediate thermal insulating layers, to a substrate surface region of the component.

By coating at least a portion of the center fuel nozzle, such as the concave interior surface region defined at the aft tip of the center fuel nozzle, with a catalytic material coating, lean blow out of the fuel nozzle is enhanced within a flame nursery zone defined at least partially by the concave interior surface region downstream of the center fuel nozzle. The concave interior surface region facilitates developing a nursery flame zone by enabling a stronger vortex. The catalytic material coating facilitates reducing flame quenching while minimizing surface cooling requirements. Further, the catalytic material stimulates fuel oxidation in a boundary layer thereby increasing a net heat release for increased local flame stability.

The present invention can be retrofitted into an existing DLN combustor and/or incorporated into new combustors for facilitating reducing $NO_x$ emissions below 4 ppmV $NO_x$ (15% $O_2$), thereby eliminating the need for after treatment in emission impacted areas without combustor redesign. Further, the present invention increases combustor lean limit and/or dynamics for increasing life and/or an acceptable fuel quality range.

Exemplary embodiments of a method and apparatus for enhancing combustor operability are described above in detail. The method and apparatus is not limited to the specific embodiments described herein, but rather, steps of the method and/or components of the apparatus may be utilized independently and separately from other steps and/or components described herein. Further, the described method steps and/or apparatus components can also be defined in, or used in combination with, other methods and/or apparatus, and are not limited to practice with only the method and apparatus as described herein.

While the invention has been described in terms of various specific embodiments, those skilled in the art will recognize that the invention can be practiced with modification within the spirit and scope of the claims.

What is claimed is:

1. A method for assembling a gas turbine engine, said method comprising:
   providing at least one combustor assembly defining a combustion chamber;
   positioning at least one fuel nozzle at a forward end of the combustion chamber, the at least one fuel nozzle configured to inject a premixed fuel/air mixture into the combustion chamber;
   bonding a thermal insulating coating to at least a portion of the at least one fuel nozzle; and
   applying a catalytic material to at least a portion of the thermal insulating coating.

2. A method in accordance with claim 1 further comprising arranging a plurality of fuel nozzles around the at least one fuel nozzle.

3. A method in accordance with claim 1 wherein said applying a catalytic material to at least a portion of the at least one fuel nozzle further comprises coating an inner surface of the at least one fuel nozzle with the catalytic material.

4. A method in accordance with claim 1 wherein said applying a catalytic material to at least a portion of the at least one fuel nozzle further comprises coating a tip portion of the at least one fuel nozzle with the catalytic material.

5. A method in accordance with claim 1 wherein said positioning at least one fuel nozzle at a forward end of the combustion chamber further comprises providing the at least one fuel nozzle that includes a tip portion that defines a concave region.

6. A method in accordance with claim 5 wherein said applying a catalytic material to at least a portion of the at least one fuel nozzle further comprises coating at least a portion of the concave region with the catalytic material.

7. A method in accordance with claim 1 wherein said applying a catalytic material to at least a portion of the at least one fuel nozzle further comprises bonding the catalytic material to at least one of a metal surface, a thermal barrier coating and a wash coat bonded to the at least one fuel nozzle.

8. A method in accordance with claim 1 wherein said providing at least one combustor assembly defining a combustion chamber further comprises providing at least one combustor assembly that includes a center fuel nozzle substrate surface region that defines a concave interior surface.

9. A method in accordance with claim 8 wherein said applying a catalytic material to at least a portion of the at least one fuel nozzle further comprises coating the concave interior surface with the catalytic material for facilitating developing a reactive fuel/air mixture to enhance flame stabilization.

10. A method in accordance with claim 1 further comprising:
    providing the at least one fuel nozzle having a substrate surface region defining a concave interior surface;
    applying at least one thermal barrier coating layer to the substrate surface region; and
    applying a catalytic coating to an outer thermal barrier layer for facilitating developing a reactive fuel/air mixture to enhance flame stabilization.

11. A gas turbine engine comprising:
    a combustor defining a combustion chamber;
    a plurality of fuel nozzles positioned at a forward end of said combustion chamber such that each of said plurality of fuel nozzles is positioned to inject a premixed fuel/air mixture into said combustion chamber, a thermal insulating coating bonded to at least a portion of at least one of said plurality of fuel nozzles, and a catalytic material bonded to said thermal insulating coating.

12. A gas turbine engine in accordance with claim 11 wherein said plurality of fuel nozzles further comprises a plurality of outer fuel nozzles arranged around at least one center fuel nozzle.

13. A gas turbine engine in accordance with claim 11 wherein an inner surface of said at least one fuel nozzle is coated with said catalytic material.

14. A gas turbine engine in accordance with claim 11 wherein a tip portion of said at least one fuel nozzle is coated with said catalytic material.

15. A gas turbine engine in accordance with claim 14 wherein said tip portion forms a concave interior surface region, at least a portion of said concave interior surface region coated with said catalytic material.

16. A gas turbine engine in accordance with claim 11 wherein said catalytic material is bonded to at least one of a metal surface of said at least one fuel nozzle, a thermal insulating coating bonded to said at least one fuel nozzle and a wash coat bonded to said at least one fuel nozzle.

17. A nozzle assembly for a gas turbine engine, said nozzle assembly comprising:
   a fuel nozzle comprising a substrate surface region, said substrate surface region defining a concave interior surface region of said fuel nozzle;
   a thermal insulating coating applied to said concave interior surface region; and
   a catalytic material applied to said thermal insulating material.

18. A nozzle assembly in accordance with claim 17 further comprising a wash coat applied to said substrate surface region, said catalytic material dispersed within said wash coat.

* * * * *